(12) United States Patent
Tanaka et al.

(10) Patent No.: US 11,412,372 B2
(45) Date of Patent: Aug. 9, 2022

(54) SECURE DISPLAY OF TRANSACTION APPROVAL CODE

(71) Applicant: International Business Machines Corporation, Armonk, NY (US)

(72) Inventors: Hiroyuki Tanaka, Tokyo (JP); Yutaka Kawai, Tokyo (JP); Norio Ueguri, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 16/807,905

(22) Filed: Mar. 3, 2020

(65) Prior Publication Data
US 2021/0282005 A1    Sep. 9, 2021

(51) Int. Cl.
| | |
|---|---|
| *H04W 12/02* | (2009.01) |
| *G06Q 20/32* | (2012.01) |
| *G06T 3/00* | (2006.01) |
| *H04W 4/02* | (2018.01) |

(52) U.S. Cl.
CPC ........ *H04W 12/02* (2013.01); *G06Q 20/3274* (2013.01); *G06T 3/0093* (2013.01); *H04W 4/023* (2013.01)

(58) Field of Classification Search
CPC .... H04W 12/02; H04W 4/023; G06T 3/0093; G06Q 20/3274
USPC ................................ 455/41.1, 566; 380/270
See application file for complete search history.

(56) References Cited

U.S. PATENT DOCUMENTS

| | | | |
|---|---|---|---|
| 8,770,478 B2 | 7/2014 | Priebatsch |
| 8,862,513 B2 | 10/2014 | Wong |
| 9,280,770 B2 | 3/2016 | Robison |
| 2013/0240622 A1 | 9/2013 | Zhou |

FOREIGN PATENT DOCUMENTS

| | | |
|---|---|---|
| JP | 2006268302 A | 10/2006 |
| WO | 2014054003 A1 | 4/2014 |

OTHER PUBLICATIONS

"Charge your PayPay Balance", Copyright (C) PayPay Corporation. All Rights Reserved, 16 pps., <https://translate.google.co.jp/translate?sl=ja&tl=en&u=https%3A%2F%2Fpaypay.ne.jp%2Fguide%2Fcharge%2F>.

(Continued)

*Primary Examiner* — Joel Ajayi
(74) *Attorney, Agent, or Firm* — David K. Mattheis; Maeve Carpenter

(57) ABSTRACT

One or more processors performing an obfuscation action on a display of a first computing device subsequent to activating a transaction application of the first computing device. The method includes one or more processors measuring a distance between the first computing device and a second computing device, wherein the display of the first computing device is directed towards the second computing device. The method further includes the one or more processors determining whether the distance between the first computing device and the second computing device meets a pre-determined threshold distance. In response to determining the distance between the first computing device and the second computing device does meet the pre-determined threshold distance, the method further includes the one or more processors deactivating the obfuscation action on the display of the first computing device and displaying an authorization image directed to the second computing device.

14 Claims, 4 Drawing Sheets

(56) References Cited

OTHER PUBLICATIONS

"Code payment fraudulently leaked Measures to prevent unauthorized use of credit card numbers, etc.", Apr. 16, 2019, 20 pps., <https://www.paymentsjapan.or.jp/wordpress/wp-content/uploads/2019/04/Fraud_Prevention_Guideline.pdf>.

Makino, "China's Cashless payment situation in China causing QR code separation | China", 3 pps., Mar. 4, 2019, © Kadokawa Ascii Research Laboratories, Inc. 2020, <https://ascii.jp/elem/000/001/817/1817202>.

"The use of Barcodes in Mobile Payments: Scanning the Possibilities", Mobile Money, Jan. 16, 2014, GSMA, 11 pps., <https://www.gsma.com/mobilefordevelopment/programme/mobile-money/the-use-of-barcodes-in-mobile-payments-scanning-the-possibilities/>.

SECURE DISPLAY OF TRANSACTION APPROVAL CODE

FIELD OF THE INVENTION

The present invention relates generally to the field of security of device displays, and more particularly to performing secure actions to protect a display of code images on digital device displays prior to completing transactions.

BACKGROUND OF THE INVENTION

Digital devices such as smartphones, smartwatches, and tablets often include or can acquire applications (apps) capable of scanning and displaying images that perform as codes identifying specific items, such as a product code identifying a particular product and including the product's price. Other examples may include codes that identify a user's account number, identification, or authentication code. Some digital devices perform scanning of images by use of camera functions included in the respective digital devices. An image of an authorization code that is displayed on the user interface (UI) screen of a first user's digital device may be read by a second user's scanning digital device to perform and complete a transaction.

Product codes identifying specific products and their price, account numbers corresponding to a particular user and financial institution, as well as identification and authentication codes are often represented by barcodes, which may occur as an image of a series of one-dimensional lines, commonly referred to as "barcodes", or a two-dimensional square pattern referred to as "quick response codes" (QR codes). Barcodes, traditionally known as Universal Product Codes (UPCs) provide unique identification when scanned. For clarity and simplicity, barcodes, QR codes, and other image-based codes capable of display on a digital device display UI are herein collectively referred to as "barcodes."

SUMMARY

Embodiments of the present invention disclose a method, computer program product, and system for obfuscating an image on a display of a computing device prior to a transaction. The method includes one or more processors performing an obfuscation action on a display of a first computing device subsequent to activating a transaction application of the first computing device. The method further includes one or more processors measuring a distance between the first computing device and a second computing device, wherein the display of the first computing device is directed towards the second computing device. The method further includes one or more processors determining whether the distance between the first computing device and the second computing device meets a pre-determined threshold distance. In response to determining the distance between the first computing device and the second computing device does meet the pre-determined threshold distance, the method further includes one or more processors completing the transaction by deactivating the obfuscation action on the display of the first computing device and displaying an image directed to the second computing device.

DETAILED DESCRIPTION

Figure 1:
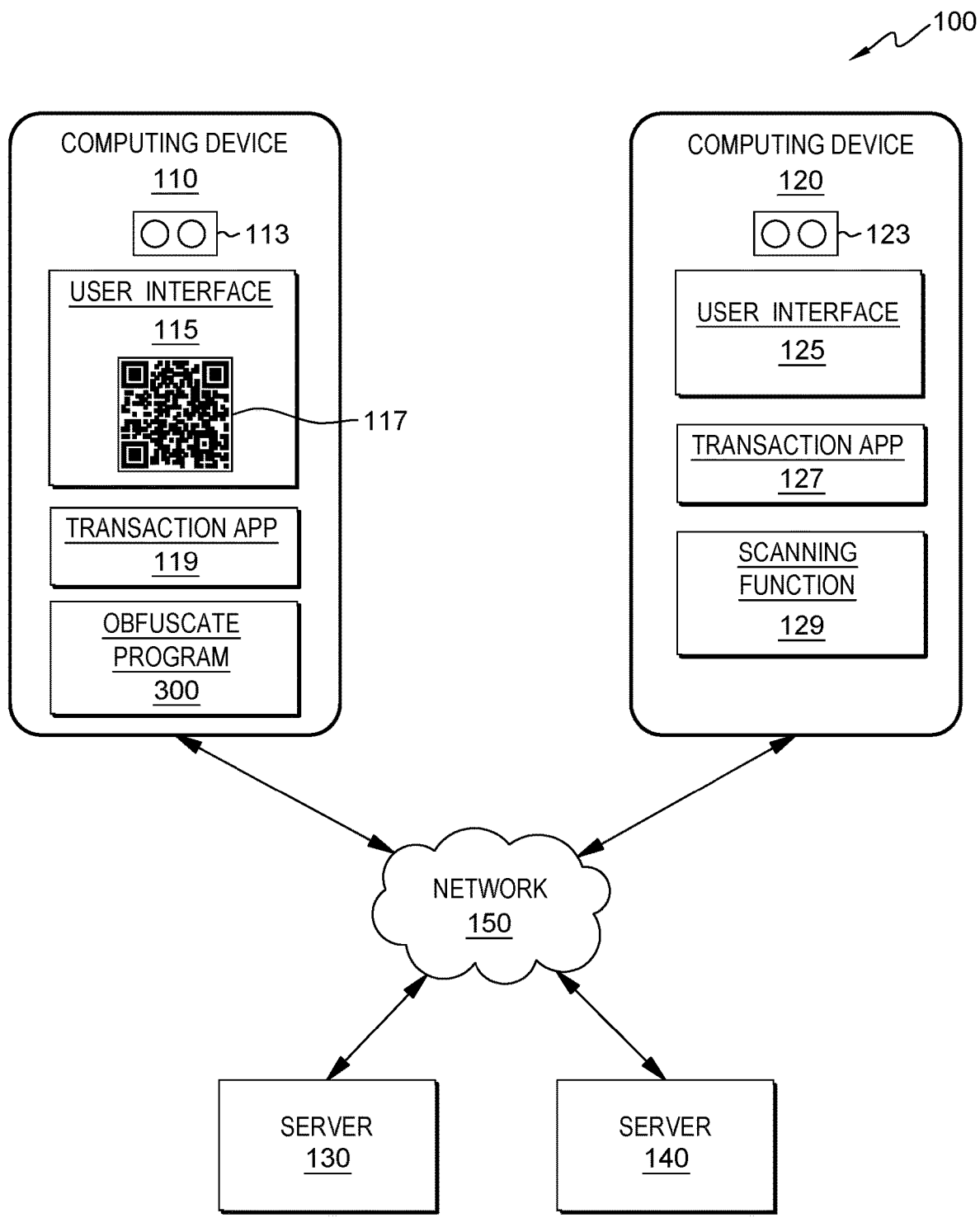
FIG. 1 is a functional block diagram illustrating a data processing environment, in accordance with an embodiment of the present invention.

Embodiments of the present invention recognize that a properly configured computing device can display an image as a code for authentication or authorization of a transaction and the image can be presented to another computing device configured to scan the displayed image and perform a verification of the authentication or authorization, thus completing the transaction. Embodiments of the present invention also recognize that the display of the image of the code can be captured and stolen by malevolent use of mobile computing devices configured with camera functionality, such as a smartphone. Stolen code images may allow malevolent users to obtain false authentication of identity, which may apply to various types of access or authorization, and the use of various types of account transactions, such as those used to make cashless payments.

Embodiments of the present invention provide a method, computer program product, and computer system for obfuscating a code image on a display of a computing device prior to a transaction. In some embodiments of the present invention, a first computing device includes an application (app) for authorizing a transaction for an owner of the computing device. In some embodiments, the first computing device is a smartphone, a smartwatch, a tablet, or another mobile computing device that includes display capability. In some embodiments, the authorization of a transaction is a cashless purchase or monetary transfer performed by presenting an authorizing code image on the display of the first computing device to a scanning device which, in some embodiments, is a second computing device. In other embodiments, the transaction may grant access to an account, entry to a building or room, access to a locked object or structure, or confirmation of identity.

In some embodiments, user activation of a transaction authorization app produces an authorizing code image displayed on a user interface of the user's computing device. In some embodiments, the displayed code image is a one-dimensional barcode image, whereas in other embodiments the displayed code image is a two-dimensional QR code image. Embodiments of the present invention recognize that during activation of the transaction authorization app, the user interface display of the user's computing device is initially directed towards the user and not the scanning device that will scan and validate the code image to complete the transaction. In the brief time that the user interface displays the code image prior to presenting the image to the scanning device, embodiments of the present invention recognize that the code image is susceptible to copy and theft.

Embodiments of the present invention provide an obfuscation action to protect the code image from copy or theft until the proximity of the scanning device to the user interface display of the first computing device meets a pre-determined threshold distance. Subsequent to determining the pre-determined threshold distance is met, embodiments of the present invention deactivate the obfuscating actions, revealing the code image to the scanning device and completing the transaction. In some embodiments, the code image is immediately removed from the display of the first computing device by a transaction application, based on receipt of a confirmation of the completion of the transaction. In other embodiments, the code image remains obfuscated until the code image is cleared from the display user interface of the computing device.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes computing device 110, computing device 120, server 130, and server 140, all interconnected via network 150. Computing device 110 further includes user interface 115, camera 113, transaction app 119, and obfuscate program 300. User interface 115 further illustrates a display of QR code 117. Computing device 120 includes camera 123, user interface 125, transaction app 127, and scanning function 129.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between computing device 110, transaction app 119 obfuscate program 300, computing device 120, transaction app 127, server 130 and server 140, in accordance with embodiments of the present invention.

Computing device 110 includes user interface 115, depicting QR code 117, camera 113, transaction app 119, and obfuscate program 300. In some embodiments, computing device 110 can be a standalone mobile computing device, such as a smartphone, a tablet computer, a smartwatch, a laptop computer, or other electronic device or computing system capable of receiving, sending, and processing data. In other embodiments, computing device 110 can be a computing device interacting with applications and services hosted and operating in a cloud computing environment. In another embodiment, computing device 110 can be a netbook computer, a desktop computer, a personal digital assistant (PDA), or another programmable electronic device capable of receiving programming instructions from transaction app 119 and obfuscate program 300 hosted on computing device 110, or communicatively connected to obfuscate program 300 operating remotely, such as on server 130. Computing device 110 includes internal and external hardware components, depicted in FIG. 4.

User interface 115 provides an interface to access features and functions of computing device 110. In some embodiments of the present invention, user interface 115 provides access to transaction app 119 and obfuscate program 300, operating on computing device 110. User interface 115 also supports access to other applications, features, and functions of computing device 110 (not shown). User interface 115 displays QR code 117 which is obfuscated subsequent to activation of a transaction app operating on computing device 110 (not shown) and prior to user interface 115 meeting a pre-determined distance threshold from a scanning device, such as computing device 120.

User interface 115 also supports access to alerts, notifications, and other forms of communication. In one embodiment, user interface 115 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also be mobile application software that provides an interface to features and functions of computing device 110. User interface 115 enables a user of computing device 110 to receive, view, hear, and respond to input, access applications, and perform functions available.

Camera 113 is an integrated feature of computing device 110. In various embodiments, camera 113 is a "front" camera of computing device 110, positioned on the same side of computing device 110 as user interface 115. Camera 113 includes photo and video functions and interacts with additional functions of computing device 110 to perform a function determining a distance of computing device 110 from a scanning device such as computing device 120. In one embodiment, camera 113 determines a distance from computing device 120 by use of focus feature calibration of camera 113. In other embodiments, camera 113 obtains images of computing device 120 as a scanning device and the distance between computing device 110 and computing device 120 is determined by obfuscate program 300 based on detected image size as the device image approaches computing device 110.

Transaction app 119 is activated and operates from computing device 110. Transaction app 119 is an application that includes generation of a code image for authentication or authorization towards performing a transaction. Transaction app 119 is activated by the user of computing device 110 and terminates subsequent to receiving confirmation of the completion of the transaction, or subsequent to a time-out duration. In some embodiments, transaction app 119 displays the code image on user interface 115 of computing device 110, enabling the code image to be read or scanned by another properly configured device, such as a scanner or a computing device configured with camera functionality and supporting scanning application.

In an example embodiment, the user of computing device 110 can activate transaction app 119 to perform a purchase transaction. The user selects the icon associated with transaction app 119 as displayed on user interface 115 of computing device 110. Transaction app 119 initiates and generates an image of QR code 117 on user interface 115. In embodiments of the present invention, obfuscate program 300, intercedes with transaction app 119 and performs an obfuscating action, such as blurring or blocking the display of QR code 117 as QR code 117 is generated.

Obfuscate program 300 protects an authorization code from theft or copy during periods in which a transaction app is initiated, and the code appears on the display screen of the user's computing device, and when the user moves the device into proximity of a scanning device to read an authorization code. In some embodiments, obfuscate program 300 is initiated by activation of transaction app 119 operating on computing device 110. Obfuscate program 300 performs an obfuscating activity associated with the user interface display of computing device 110 to render the code (e.g., barcode, QR code) image providing authorization for a transaction indecipherable. For example, obfuscate program 300 may blur, block, or present a false barcode image on the user interface 115 of computing device 110. Obfuscate program 300 maintains the obfuscating action and determines whether the distance between computing device 110 and the scanning device reading and validating the code image meets a pre-determined distance threshold. Subsequent to determining the pre-determined distance threshold is met, obfuscate program 300 deactivates the obfuscating action and renders a clear image of the authorizing code, such as QR code 117. Subsequent to a notification of completion of the transaction obfuscate program 300 clears the code image from the user interface of computing device 110.

Computing device 120 includes user interface 125, camera 123, transaction app 127, and scanning function 129. In some embodiments, computing device 120 can be a stand-alone mobile computing device, such as a smartphone, a tablet computer, a smartwatch, a laptop computer, or other electronic device or computing system capable of receiving, sending, and processing data. In other embodiments, computing device 120 can be a computing device interacting with applications and services hosted and operating in a cloud computing environment. In another embodiment, computing device 120 can be a netbook computer, a desktop computer, a personal digital assistant (PDA), or another programmable electronic device capable of receiving programming instructions from scanning function 129 on computing device 120. In some embodiments, computing device 120 may be communicatively connected to scanning function 129 hosted and operating remotely on server 140. Computing device 120 includes internal and external hardware components, depicted in FIG. 4.

User interface 125 provides an interface to access features and functions of computing device 120. In some embodiments of the present invention, user interface 125 provides access to transaction app 127, operating on computing device 120. User interface 125 also supports access to scanning function 129, and other applications, features, and functions of computing device 120 (not shown). User interface 125 also supports access to alerts, notifications, and other forms of communications. In one embodiment, user interface 125 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 125 may also be mobile application software that provides an interface to features and functions of computing device 120. User interface 125 enables a user of computing device 120 to receive, view, hear, and respond to input, access applications, and perform functions available.

Camera 123 is an integrated feature of computing device 120. In various embodiments, camera 123 is a "front" camera of computing device 120, positioned on the same side of computing device 120 as user interface 115. Camera 123 includes photo and video functions and interacts with additional functions of scanning function 129. In some embodiments, camera 123 interacts with scanning function 129 to recognize authorization codes presented on a user interface of another computing device.

Transaction app 127 is activated and operates from computing device 120. Transaction app 127 is an application that initiates a transaction requiring authentication or authorization from a code image to validate the code and complete the transaction. Transaction app 127 is activated by the user of computing device 120 and terminates subsequent to receiving confirmation of the completion of the transaction, or subsequent to a time-out duration. In some embodiments, transaction app 127 works in conjunction with scanning function 129 that receives image data from camera 123 and processes the received image data from scanning function 129 to authenticate or authorize the transaction in progress. In some embodiments, the authentication or authorization may include communication with data and/or applications located on server 140 or server 130. Transaction app 127 terminates subsequent to receiving confirmation of the completion of the transaction or subsequent to a time-out duration.

In an example embodiment, transaction app 127 is activated by the user of computing device 120 to perform a purchase transaction. The user selects the icon associated with transaction app 127 as displayed on user interface 125 of computing device 120. Transaction app 127, in conjunction with camera 123 and scanning function 129, scans barcodes of products to determine the product identity and price. In some embodiments, transaction app 127 communicates with server 140 via network 150 to access data associated with the identity and price of the scanned products, and transaction app 127 displays the listed products and prices, including the total price of the purchase transaction on user interface 125 of computing device 120. Transaction app 127 scans a code image (i.e., QR code 117), displayed on user interface 115 of computing device 110 and interacts with server 130 to confirm authorization of the purchase transaction.

In some embodiments of the present invention, server 130 supports a transaction between computing device 110 and computing device 120. For example, server 130 may include a financial account to which computing device 110, operating transaction app 119, performs a cashless transaction for a purchase. Computing device 120 connects with server 130 to confirm the authorization code presented on user interface 115 of computing device 110 and the available funds to cover the purchase transaction. Server 130 may include features to identify the user associated with computing device 110 and the financial account in the example. In various embodiments, server 130 provides QR code 117 as authorization of the user's financial account, which is associated with the transaction app of computing device 110.

Server 130 can be a web server, a blade server, a desktop computer, a laptop computer, a tablet computer, a netbook computer, or any other programmable electronic computing device capable of operating obfuscate program 300, receiving, sending, and processing data, and communicating via network 150 with computing device 110, computing device 120, server 140, and other computing devices (not shown) within data processing environment 100 via network 150. In other embodiments, server 130 can represent a virtual computing device operating based on multiple computers as a server system, such as in a cloud computing environment. In another embodiment, server 130 represents a computing system utilizing clustered computers and components (e.g., database server computers, application server computers, etc.) that act as a single pool of seamless resources when accessed within data processing environment 100. Server 130 may include internal and external hardware components, as depicted and described in FIG. 4.

In some embodiments of the present invention, server 140 supports a transaction associated with computing device 120, which generates information associated with a transaction and receives authentication or authorization to complete the transaction by a scanning function of computing device 120. In some embodiments, server 140 may include a database of product information for a purchase transaction whereas, in another embodiment, server 140 may include information associated with entry access to a protected area. In an example embodiment, server 140 may include information regarding the identification and price associated with a purchasing transaction. Server 140 may receive product information from transaction app 127 which was scanned by scanning function 129. Server 140 may provide the identification and price associated with the scanned product information and return the identification and price information to transaction app 127 for display on user interface 125 of computing device 120.

Server 140 may also receive data from a scanning of QR code 117 and verify financial account information by communicating with server 130 over network 150. For example, server 140 receives information associated with QR code 117 scanned by scanning function 127 via camera 123 operating on computing device 120. Server 140 verifies the financial account on server 130 and confirms the transaction, which may include performing a cashless transaction for a purchase.

Server 140 may include features to identify the user associated with computing device 110 and the financial account in the example. In various embodiments, server 140 verifies QR code 117 as authorization of the computing device 110 user's financial account, which is associated with the transaction app of computing device 110. Server 140 can be a web server, a blade server, a desktop computer, a laptop computer, a tablet computer, a netbook computer, or any other programmable electronic computing device capable of operating obfuscate program 300, receiving, sending, and processing data, and communicating via network 150 with computing device 110, computing device 120, server 130, and other computing devices (not shown) within data processing environment 100 via network 150. In other embodiments, server 140 can represent a virtual computing device operating based on multiple computers as a server system, such as in a cloud computing environment. In another embodiment, server 140 represents a computing system utilizing clustered computers and components (e.g., database server computers, application server computers, etc.) that act as a single pool of seamless resources when accessed within data processing environment 100. Server 140 may include internal and external hardware components, as depicted and described in FIG. 4.

In embodiments of the present invention, obfuscate program 300 performs an obfuscating action to protect the detection of the code image displayed on user interface 115 of computing device 110. Obfuscate program 300 maintains the obfuscating action while user interface 115 and camera 113 are at a distance from computing device 110 that does not meet the pre-determined distance threshold.

Exemplary embodiments presented herein, include a cashless purchase payment as a transaction performed using a QR code for authorization displayed on a first smartphone, and scanned and validated by a second smartphone. Example embodiments are presented for purposes of clarity and conciseness of the features of the disclosed invention; however, embodiments of the present invention are not limited to the particular transactions, code images, and computing devices of the examples.

Embodiments of the present invention also recognize that obfuscation actions include, but are not limited to, blurring of the code image, blocking the code image, replacing the code image with a false image, rapid movement of the code image, or other action directed at preventing copying or detection of the code image subsequent to activation of the transaction app and prior to detection of the display of the first smartphone meeting a pre-determined distance threshold of the scanning device (i.e., a second smartphone).

Figure 2:
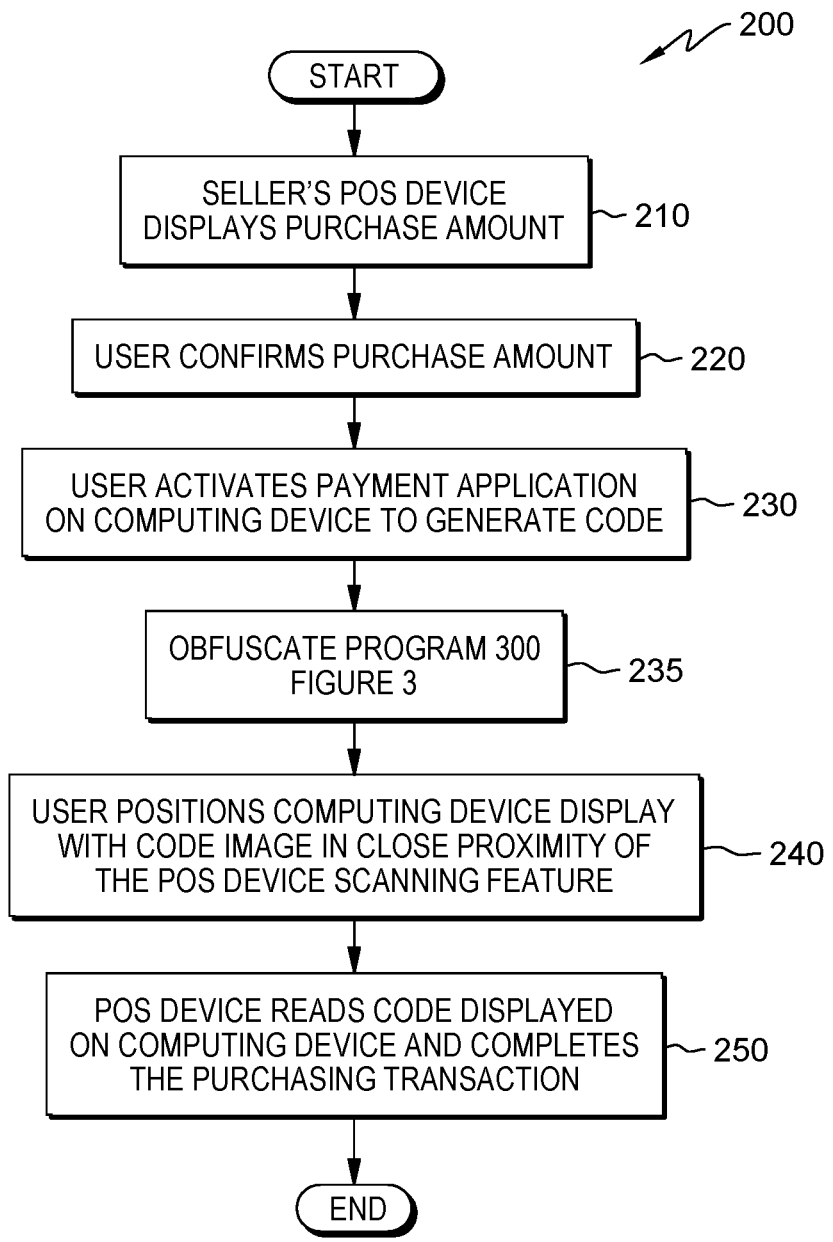
FIG. 2 is a block diagram illustrating a sequence of steps of an example transaction between computing devices, in accordance with an embodiment of the present invention.

FIG. 2 is a block diagram illustrating a sequence of steps of example transaction 200 between computing devices, in accordance with an embodiment of the present invention. Example transaction 200 includes a cashless purchase transaction of items that two computing devices are properly configured to perform. Although a purchase transaction is presented as an example, embodiments of the present invention recognize that other transaction types benefit as well, such as reservations, membership authentication, access to restricted areas, and other transactions. In the example embodiment, the purchasing user utilizes a first smart device (e.g., computing device 110) and the seller utilizes a second smart device (e.g., computing device 120) as a point-of-sale (POS) device.

In step 210 the seller displays the purchase amount on the seller's POS device. In various embodiments, the seller scans the barcodes of the items identified by the purchasing user and displays the total of the purchase on the POS device. In step 220 the user views and confirms (agrees with) the total purchase amount displayed on the second computing device.

For example, referring to FIG. 1, the user of computing device 120 activates transaction app 127 and scans a plurality of products selected by the user of a first computing device utilizing camera 123 and scanning function 129. Computing device 120 sends the scanned results to server 140 that includes a database of products. The scanned product identities and the respective prices are retrieved and sent to computing device 120 where they are in turn displayed on user interface 125, along with the total purchase price, for view by the user of computing device 110.

In step 230, the purchasing user activates a transaction app on the purchasing user's computing device to generate a code image to confirm the purchase transaction. Having confirmed the total purchase amount displayed on the POS device of the seller, the purchasing user activates a transaction app on the purchaser's computing device. The transaction app on the purchasing user's computing device initiates the generation of a code image to confirm the purchase transaction.

Figure 3:
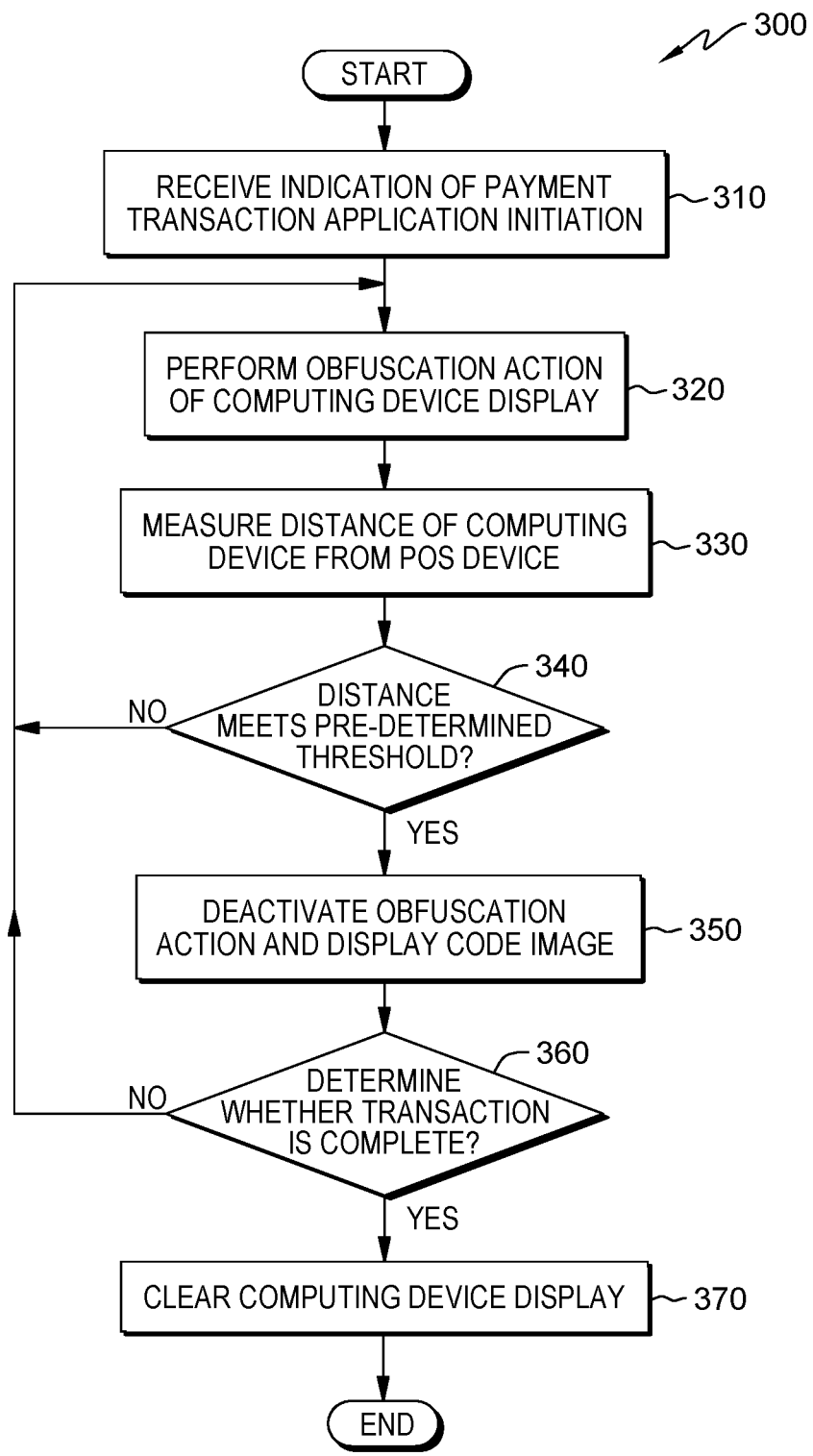
FIG. 3 illustrates operational steps of an obfuscate program, inserted on a computing device within the data processing environment of FIG. 1, in accordance with an embodiment of the present invention.

In step 235, the activation of the transaction app initiates obfuscate program 300, discussed in detail regarding FIG. 3. Step 235 indicates that obfuscate program 300 initiates prior to display of an authorization code image on the purchasing user's computing device.

In step 240, the purchasing user's computing device is positioned by the purchasing user within close proximity of the POS device scanning feature. In the example embodiment, the computing device of the purchasing user generates a code image in response to the activation of the transaction app on the purchasing user's computing device. The purchasing user positions the user interface display of the computing device in close proximity to the scanning feature of the POS device. For example, the purchasing user activates transaction app 119 on computing device 110 which initiates generation of the image of QR code 117 on user interface 115 of computing device 110 to authorize the transaction. Activation of transaction app 119 also initiates obfuscate program 300 that intervenes in the display of the code image (discussed further with regards to FIG. 3). The purchasing user moves computing device 110 to a position such that user interface 115 is facing the scanning camera and in close proximity to the POS device.

In step 250 the POS device scans the code image displayed on the purchasing user's computing device, confirms the authorization code, and completes the purchase transaction. The transaction app on the purchasing user's computing device clears the display of the authentication code image and ends. The transaction app on the POS records the transaction and ends or enters a sleep mode until a subsequent transaction is detected. In an exemplary embodiment, transaction app 127 activates camera 123 and scanning function 129 and scans QR code 117 displayed on user interface 115 of computing device 110. Transaction app 127 validates the authorization associated with QR code 117 by connection to server 140 and to server 130 via network 150. Receiving confirmation of the authorization, transaction app 127 complete and stores the transaction and ends or enters a sleep mode until the next transaction is initiated.

FIG. 3 illustrates the operational steps of obfuscate program 300, inserted on computing device 110 within data processing environment 100 of FIG. 1, in accordance with an embodiment of the present invention. The description and details of obfuscate program 300 presented herein utilize a payment transaction as an example embodiment, but it is acknowledged that embodiments of the present invention are not limited to payment transactions. The payment transaction includes a point of sale (POS) device that determines and displays the price of a purchase transaction and includes scanning functions to read and validate an authorization code image generated and displayed on the user interface of the computing device of the purchaser (authorizing computing device). In various embodiments, obfuscate program 300 works in conjunction with a transaction app, such as transaction app 119, and in some embodiments, obfuscate program 300 may be an integrated feature of a transaction app.

Obfuscate program 300 receives an indication of the initiation of a payment transaction application (step 310). A transaction app on a computing device, such as a smartphone, is activated by the smartphone user to initiate a transaction to make a purchase using cashless payment. Obfuscate program 300 receives an indication of the initiation of the transaction app. For example, a user of computing device 110, which may be a smartphone, activates transaction app 119 to generate an authorization code image on user interface 115 of computing device 110. Obfuscate program 300 receives an indication from transaction app 119 of the initiation of the app.

Obfuscate program 300 performs an obfuscation action of the computing device display (step 320). Subsequent to receiving the indication of the initiation of the transaction app, obfuscate program 300 performs an action that obfuscates the generation of the authorization code image on the user interface display of the authorizing computing device. The obfuscation action prevents the accurate or readable display of the actual code image used to authorize the transaction in progress. In some embodiments of the present invention, the obfuscation action may be a blurring effect of the display of the code image, such that the code information cannot be read by a scanning device. In other embodiments, the obfuscation action blocks the display of the code image by displaying a non-code image or blocking the display of the code image with an overlaying image. In yet other embodiments, the obfuscation action displays a false image that is substituted for the code image to prevent detection or copy of the actual authorizing code image.

For example, obfuscate program 300 receives an indication that transaction app 119 has been initiated and generates a solid block image on user interface 115 of computing device 110 covering the code image that is generated by transaction app 119. The solid block image completely overlays the display area preventing the display, detection, and copying (i.e., photograph or video) of the authorization code image by any bystanders.

Obfuscate program 300 measures the distance of the computing device from the POS device (step 330). Obfuscate program 300 maintains the obfuscation action and initiates a measurement function to determine a distance between the display side of the computing device authorizing the transaction and the scanning device that reads the code image to validate the authorization and complete the transaction. In some embodiments, obfuscate program 300, operating on computing device 110 can activate the display-side camera to detect and recognize a scanning device. In some embodiments, the camera determines a distance between the authorizing computing device and the scanning device by determining a relative size of the scanning device image within the view area of the camera in which the portion of the view field of the camera filled by the image of the scanning device corresponds to a distance between the devices. In some embodiments, the auto-focus function of the camera correlates a focus setting to a particular distance between the devices. In yet other embodiments, the computing device authorizing the transaction may be configured with apps and features to detect the distance between the computing device and the scanning device by optical, audio, or wireless technologies.

Obfuscate program 300 determines whether the distance between the computing device and the POS device meets a pre-determined threshold distance (decision step 340). Obfuscate program 300 continually receives measurement data of the distance between the authorizing computing device and the scanning computing device, as the user of the authorizing computing device positions the display of the authorizing computing device oriented towards the scanning computing device, moving the authorizing computing device closer to the scanning computing device. For example, obfuscate program 300 continually receives measurement data as the user of computing device 110 orients the display side towards computing device 120 as the scanning device and moves computing device 110 closer towards the scanning device. Obfuscate program 300 receives the distance measurement between computing device 110 and computing device 120.

For the case in which the threshold distance is not met (step 340, "NO" branch), obfuscate program 300 maintains the obfuscation action of the user interface of the authorizing computing device, returning to step 320. For example, obfuscate program 300 continually receives measurement data as the authorizing computing device, computing device 110 is moved towards the POS scanning device, computing device 120, and determines that the measurement data exceeds the pre-determined threshold distance of 10 centimeters. Obfuscate program 300 responds by maintaining the obfuscation action of blocking the display of the authorization code on user interface 115 of computing device 110.

For the case in which the threshold distance is met (step 340, "YES" branch), obfuscate program 300 deactivates the obfuscation action, allowing readable display of the authorization code image (step 350). In response to obfuscate program 300 determining that the distance between the authorizing computing device and the POS computing device has met or is less than a pre-determined threshold distance, obfuscate program 300 deactivates the obfuscation action, allowing the accurate and readable display of the authorizing code image, which is within the predetermined threshold distance of the POS scanning device. For example, obfuscate program 300 determines that the distance between computing device 110 and computing device 120 is less than 10 centimeters, which is the predetermined threshold distance, and obfuscate program 300 deactivates the obfuscation action of blocking the image of QR code 117 on user interface 115 of computing device 110, enabling scanning function 129 of computing device 120 to read QR code 117 and confirm the device-to-device transaction.

Obfuscate program 300 determines whether the payment transaction is complete (decision step 360). Obfuscate program 300 maintains deactivation of the obfuscation action if the authorizing computing device remains within the predetermined threshold distance of the POS scanning device and prior to receiving confirmation of the payment transaction completion from the transaction app. In some embodiments of the present invention, obfuscate program 300 re-activates the obfuscation action if the measured distance between the authorizing computing device and the POS computing device exceeds the pre-determined threshold distance, and again deactivates the obfuscation action once the authorizing computing device returns to a position within the threshold distance. In some embodiments, the authorization code image is read by the POS computing device operating a transaction app that validates whether the authorization is valid, and the payment amount is available by communication with a server associated with the authorization account.

For example, obfuscate program 300 deactivates the obfuscation action of blocking the display of QR code 117 on user interface 115 of computing device 110, and computing device 120 reads QR code 117 via scanning function 129 and transaction app 127. Transaction app 127 communicates with server 130 that is associated with the financial account of QR code 117.

For the case in which obfuscate program 300 determines the payment transaction cannot be completed (step 360, "NO" branch), obfuscate program receives a message indicating the transaction is not complete and proceeds to step 320 and re-activates the obfuscation action protecting detection of the authorization code image. In some embodiments, the transaction may receive notification that the authorization is invalid, or the payment funds are not available, or other reason for completion of the transaction to be prevented. In some embodiments, the notification is shared with obfuscate program 300 which, in response, re-activates the obfuscation action to protect the code image displayed. In other embodiments, obfuscate program 300 determines that a delay in confirmation of the completion of the transaction has exceeded a pre-determined duration threshold, and similarly proceeds to step 320 and re-activates the obfuscation action.

For example, obfuscate program 300 deactivates the obfuscation action and scanning function 129 scans QR code 117 on user interface of computing device 110, and sends the data to transaction app 127. Transaction app 127 communicates with server 130 to validate QR code 117 associated with the financial account of the user of computing device 110. Transaction app 127 receives a notification that the transaction cannot be completed. The notification may indicate an invalid QR code, lack of funds to meet the payment, or server communication issues with server 130, as examples. Transaction app 127 communicates to transaction app 119 and obfuscate program 300 that the transaction is not complete. Obfuscate program 300 proceeds to step 320 and re-activates the obfuscation action to protect the image of QR code 117 on user interface 115 of computing device 110.

For the case in which obfuscate program 300 determines the payment transaction is complete (step 360, "YES" branch), obfuscate program 300 clears the code image from the authorizing computing device display (step 370). In response to receiving a notification from the transaction app confirming the completion of the transaction (settled transaction), obfuscate program 300 clears the authorization code image from the user interface display of the authorizing computing device. For example, transaction app 127 operating on POS computing device 120 receives confirmation from server 130 that the authorization code image is valid and adequate payment funds are available to complete the payment transaction. Transaction app 127 communicates with transaction app 119 and obfuscate program 300 on computing device 110 that the transaction is complete. Obfuscate program 300 clears the display of the code image from user interface 115 of computing device 110 and obfuscate program 300 ends.

Figure 4:
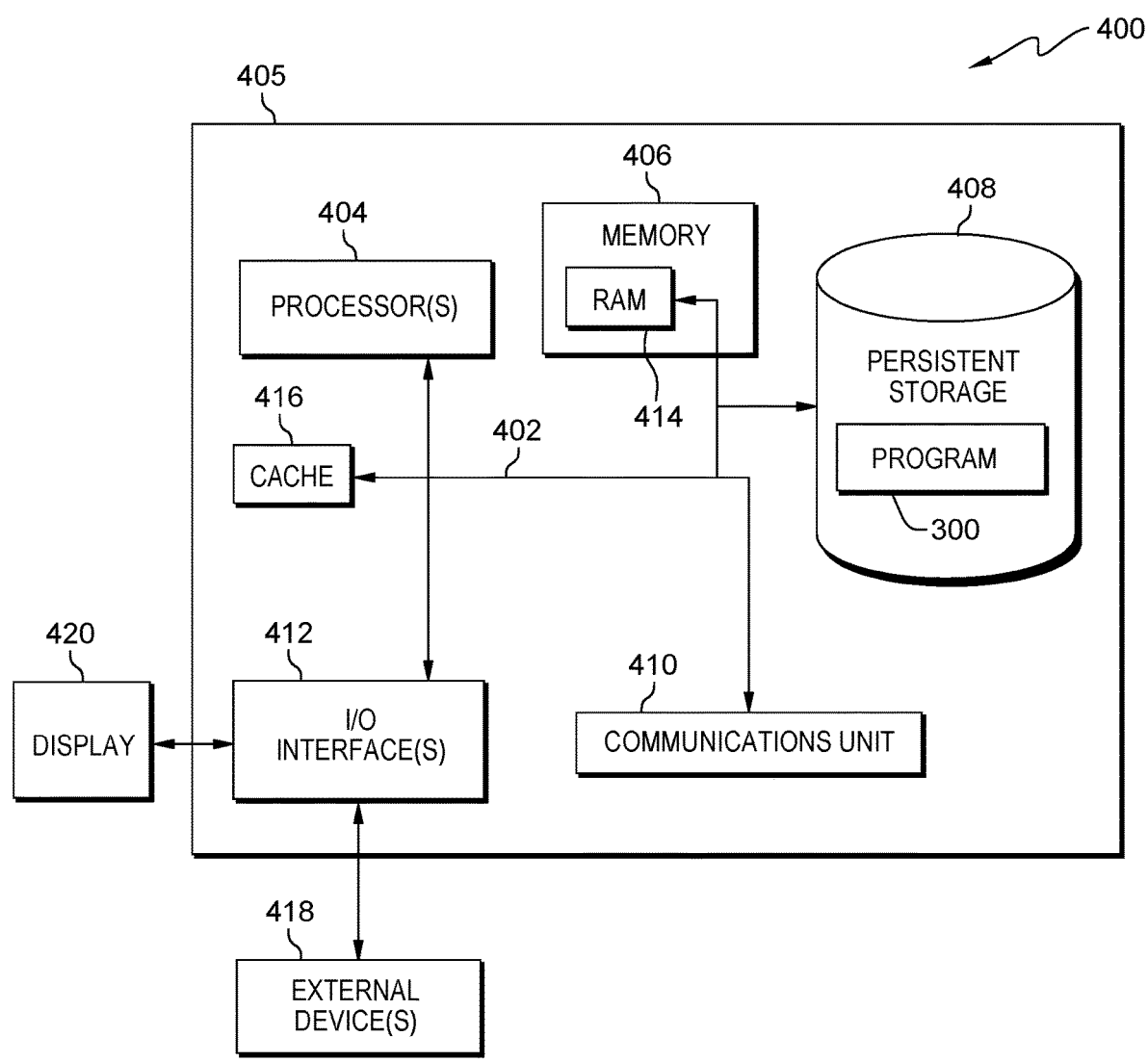
FIG. 4 depicts a block diagram of components of a computing system capable of operationally performing the obfuscate program, in accordance with an embodiment of the present invention.

FIG. 4 depicts a block diagram of components of a computing system, which includes computing device 405, having components and functional capability similar to computing device 110, computing device 120, server 130 and server 140, (FIG. 1), and capable of operationally performing obfuscate program 300, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

Obfuscate program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of data processing environment 100, such as computing device 110, computing device 120, server 130, and server 140. In these examples, communications unit 410 includes one or more network interface cards. Communications unit 410 may provide communications through the use of either or both physical and wireless communications links. Obfuscate program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., web content program 300 can be stored on such portable computer-readable storage media and can be loaded onto persistent storage 408 via I/O interface(s) 412. I/O interface(s) 412 also connects to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for securing a display of a device, the method comprising:
    performing, by one or more processors, an obfuscation action on an image of a display of a first computing device subsequent to initiating a device-to-device transaction by activating a transaction application of the first computing device, wherein the obfuscation action includes displaying a falsified image on the display of the first computing device as a temporary replacement for the image;
    measuring, by the one or more processors, a distance between the first computing device and a second computing device, wherein the distance between the first computing device and the second computing device is measured using an auto-focus function of a camera feature of the first computing device;
    determining, by the one or more processors, whether the distance between the first computing device and the second computing device meets a pre-determined threshold distance; and
    in response to determining the distance between the first computing device and the second computing device does meet the pre-determined threshold distance, the one or more processors deactivating the obfuscation action on the display of the first computing device and displaying the image directed to the second computing device, confirming the device-to-device transaction.

2. The method of claim 1, wherein the device-to-device transaction is a cashless payment transaction.

3. The method of claim 1, wherein the obfuscation action includes blurring the image on the display of the first computing device.

4. The method of claim 1, wherein displaying the image directed to the second computing device enabling the transaction includes displaying a barcode.

5. The method of claim 1, further comprising:
    detecting the second computing device as an object; and
    determining the distance between the first computing device and the second computing device by measuring a relative size of the object in a field of view of a camera function of the first computing device.

6. A computer program product for securing a display of a device, the computer program product comprising:
    one or more computer readable storage media wherein the computer readable storage medium is non-transitory and program instructions stored on the one or more computer readable storage media, the program instructions comprising:
        program instructions to perform an obfuscation action on an image of a display of a first computing device subsequent to initiation of a device-to-device transaction by activating a transaction application of the first computing device, wherein the obfuscation action includes displaying a falsified image on the display of the first computing device as a temporary replacement for the image;
        program instructions to measure a distance between the first computing device and a second computing device, wherein the distance between the first computing device and the second computing device is measured using an auto-focus function of a camera feature of the first computing device;
        program instructions to determine whether the distance between the first computing device and the second computing device meets a pre-determined threshold distance; and
    in response to determining the distance between the first computing device and the second computing device does meet the pre-determined threshold distance, program instructions to deactivate the obfuscation action on the display of the first computing device and display the image directed to the second computing device, confirming the device-to-device transaction.

7. The computer program product of claim 6, wherein the transaction is a cashless payment transaction.

8. The computer program product of claim 6, wherein the obfuscation action includes blurring the image on the display of the first computing device.

9. The computer program product of claim 6, wherein displaying the image directed to the second computing device enabling the transaction includes displaying a barcode.

10. The computer program product of claim 6, further comprising:
    program instructions to detect the second computing device as an object; and
    program instructions to determine the distance between the first computing device and the second computing device by measuring a relative size of the object in a field of view of a camera function of the first computing device.

11. A computer system for obfuscating an image on a display of a computing device prior to completion of a device-to-device transaction, the computer program product comprising:
    one or more computer processors, one or more computer readable storage media, wherein the computer readable storage medium is non-transitory, program instructions stored on the computer readable storage media for execution by at least one of the one or more processors, the program instructions comprising:

program instructions to perform an obfuscation action on an image of a display of a first computing device subsequent to initiation of a device-to-device transaction by activating a transaction application of the first computing device, wherein the obfuscation action includes displaying a falsified image on the display of the first computing device as a temporary replacement for the image;

program instructions to measure a distance between the first computing device and a second computing device, wherein the distance between the first computing device and the second computing device is measured using an auto-focus function of a camera feature of the first computing device;

program instructions to determine whether the distance between the first computing device and the second computing device meets a pre-determined threshold distance; and in response to determining the distance between the first computing device and the second computing device does meet the pre-determined threshold distance, program instructions to deactivate the obfuscation action on the display of the first computing device and display the image directed to the second computing device, completing the device-to-device transaction.

12. The computer system of claim 11, wherein the obfuscation action includes blurring the image on the display of the first computing device.

13. The computer system of claim 11, wherein displaying the image directed to the second computing device enabling the transaction includes displaying a barcode.

14. The computer system of claim 11, further comprising:
program instructions to detect the second computing device as an object; and
program instructions to determine the distance between the first computing device and the second computing device by measuring a relative size of the object in a field of view of a camera function of the first computing device.

* * * * *